Patented Dec. 19, 1939

2,183,958

UNITED STATES PATENT OFFICE 2,183,958

ART OF DESENSITIZING JUICES DERIVED FROM PLANTS OF THE CASHEW FAMILY

Martha Blanchard Cayo, Germantown, Pa., assignor to Durite Plastics, Incorporated, Philadelphia, Pa., a corporation of Pennsylvania No Drawing. Application October 23, 1937, Serial No. 170,706

9 Claims. (Cl. 134—56)

This invention relates to the art of desensitizing the juices derived from certain plants of the cashew family.

The plants of the cashew family (Anacardiaceae) are characterized by the fact that they yield juices which are of acrid, caustic and resinous nature. The juices of certain of the plants of this family have found some application in the industries. Thus, the juices of the Japanese and Chinese varnish trees (Rhus vernicifera) have for centuries been used in the manufacture of varnishes and lacquers. More recently, the shell liquids of the cashew nut (Anacardium occidentale) and the marking nut (Anacardium orientale or Semecarpus anacardium) have been employed in the manufacture of printing inks, varnishes, lacquers and synthetic resins. The greatest drawback to the use of these materials, particularly in this country, is the fact that certain of the juices produce dermatitis or the "poison ivy" effect in persons who are not immune to this type of poisoning. In this connection, it may be stated that during the World War when Chinese lacquer was imported into this country for use on aeroplane propellers, it was found necessary to employ Chinese workmen to apply the lacquer due to the fact that western workers developed dermatitis.

An important object of the present invention is to provide a simple, relatively inexpensive method for desensitizing those juices and liquids derived from the plants of the cashew family which tend to produce dermatitis in persons who are not immune to this type of poisoning.

Another important object is to provide a method for greatly reducing or eliminating entirely the "poison ivy" effect which is characteristic of certain of the juices and liquids derived from plants of the cashew family.

Another important object is to provide a method for greatly reducing or eliminating entirely the "poison ivy" effect of the shell liquids of the cashew and marking nuts.

Another object is to provide a method for desensitizing the juices and liquids derived from certain plants of the cashew family without adversely affecting the properties which have rendered the untreated juices and liquids of said plants useful in industry.

Still another object is to provide a method for treating the juices and liquids of certain plants of the cashew family, which is susceptible of being carried out by unskilled labor on the plantation, thus decreasing to a minimum the industrial hazards in this country incident to the handling of these materials.

A further object is to provide a new class of compositions derived from the juices and liquids of certain plants of the cashew family which are substantially devoid of the tendency to produce dermatitis or the "poison ivy" effect in persons who are not immune to this type of poisoning, while possessing substantially all the properties which have rendered the juices and liquids useful in industry.

Briefly stated, the method of the present invention consists in treating the poisonous juices or liquids derived from plants of the cashew family with an amide or a mixture of amides.

Among the amides which may be used in practicing the teachings of the invention may be mentioned cyanamide and the acid amides including acetamide, benzamide, carbamide (urea), biuret, formamide, oxamide and succinamide.

Instead of an amide, a derivative of an amide may be used. Thus, instead of cyanamide ($CN.NH_2$), I may employ commercial cyanamide or calcium cyanamide ($CN.NCa$).

If calcium cyanamide or commercial cyanamide is used, an organic or mineral acid such as acetic, citric, hydrochloric or sulphuric or an acid salt such as sodium or potassium bisulphate may be added to the reaction mixture. The purpose of the acid or acid salt is to reduce the hydrogen ion concentration to a range of from pH 1.5 to pH 3.

The following example is given as a preferred procedure embodying the method of the invention.

An amide such as oxamide or a mixture of amides such as acetamide and oxamide is added to cashew nut shell liquid in the proportion of four ounces of amide to one gallon of the liquid. The mixture is thoroughly mixed in any suitable manner as by agitation, and the temperature is gradually raised until 580° F. or thereabouts is reached. The agitation is preferably continued during the heating.

As another example of a suitable procedure may be mentioned the following:

Commercial cyanamide or calcium cyanamide (four to eight ounces) is added to a gallon of cashew nut shell liquid, and the temperature is gradually raised to about 580° F. while the mass is continuously stirred.

A variation consists in acidifying the cyanamide before it is added to the shell liquid or in acidifying the mixture of cyanamide and shell liquid before it is heated. The acidulation may be accomplished by adding about four fluid ounces of hydrochloric acid (1 to 10% concentration) to the cyanamide or to the mixture of cyanamide and shell liquid.

Cyanamide, particularly in the form of fertilizer, affords an exceedingly inexpensive raw material for use in my process.

The treatment of the juices and liquids of the plants of the cashew family in accordance with the teachings of the present invention does not adversely affect the properties which have rendered the untreated juices of certain of said plants useful in industry. Hence, it follows that the desensitized substances may be used for the same purposes without, however, the industrial hazards due to the "poison ivy" effect of the untreated juices. Among the many possible applications of the desensitized juices, particularly those derived from the shells of the cashew and marking nuts may be mentioned the manufacture of inks, coatings, paints, varnishes, lacquers, preservatives, impregnating agents, adhesives, cements, lutes, molding compositions, synthetic resins, etc.

The desensitizing treatment may advantageously be carried out on the plantations with native labor. Hence, the present invention affords a practical means for greatly reducing the industrial hazards incident to the handling of the juices and liquids of the plants of the cashew family.

The invention in its specific aspects has been described with particular reference to the treatment of cashew nut shell liquid, for not only is this one of the most promising applications of the invention, but it also lends itself admirably for the specific disclosure of the invention such as is required by the patent statutes. Hence, although the invention has been described with considerable detail and particularity and certain specific terms and language have been utilized, it is to be distinctly understood that the foregoing disclosure is illustrative, rather than restrictive and that no limitations are to be imported which are not required by the language of the claims and the state of the prior art.

I claim:

1. The method of desensitizing the juices or liquids of the plants of the cashew family such as the shell liquids of the cashew nut, which consists in heating the juices or liquids to be desensitized with an amide selected from the group consisting of acetamide, benzamide, carbamide, biuret, formamide, oxamide and succinamide.

2. The method of desensitizing the juices or liquids of the plants of the cashew family such as the shell liquids of the cashew nut, which consists in heating the juices or liquids to be desensitized with formamide.

3. The method of desensitizing the juices or liquids of the plants of the cashew family such as the shell liquids of the cashew nut, which consists in heating the juices or liquids to be desensitized with oxamide.

4. The method of desensitizing the juices or liquids of the plants of the cashew family such as the shell liquids of the cashew nut, which consists in heating the juices or liquids to be desensitized with benzamide.

5. The method of desensitizing the juices or liquids of the plants of the cashew family such as the shell liquids of the cashew nut, which consists in adding an amide selected from the group consisting of acetamide, benzamide, carbamide, biuret, formamide, oxamide and succinamide to the shell liquids in the ratio of four ounces of amide to one gallon of the liquids, and gradually raising the temperature to about 580° F.

6. The method of desensitizing the juices or liquids of the plants of the cashew family such as the shell liquids of the cashew nut, which consists in adding an acid amide to the shell liquids in the ratio of four ounces of acid amide to one gallon of the liquids and gradually raising the temperature to about 580° F.

7. As a composition of matter, the reaction product of the juices or liquids of the plants of the cashew family with an amide selected from the group consisting of acetamide, benzamide, carbamide, biuret, formamide and succinamide, said reaction product being substantially devoid of the tendency to produce dermatitis.

8. As a composition of matter, the reaction product of the juices or liquids of the plants of the cashew family with oxamide, said reaction product being substantially devoid of the tendency to produce dermatitis.

9. As a composition of matter, the reaction product of the juices or liquids of the plants of the cashew family with benzamide, said reaction product being substantially devoid of the tendency to produce dermatitis.

MARTHA BLANCHARD CAYO.